(12) United States Patent
Okabe et al.

(10) Patent No.: US 12,209,390 B2
(45) Date of Patent: Jan. 28, 2025

(54) WORK MACHINE, AND METHOD FOR CONTROLLING WORK MACHINE

(71) Applicant: KOMATSU LTD., Tokyo (JP)

(72) Inventors: Kazuyoshi Okabe, Tokyo (JP); Renia Yasumura, Tokyo (JP); Hirofumi Minato, Tokyo (JP); Shinichi Kitao, Tokyo (JP)

(73) Assignee: KOMATSU LTD., Tokyo (JP)

( * ) Notice: Subject to any disclaimer, the term of this patent is extended or adjusted under 35 U.S.C. 154(b) by 352 days.

(21) Appl. No.: 17/619,407

(22) PCT Filed: Sep. 14, 2020

(86) PCT No.: PCT/JP2020/034679
§ 371 (c)(1),
(2) Date: Dec. 15, 2021

(87) PCT Pub. No.: WO2021/065439
PCT Pub. Date: Apr. 8, 2021

(65) Prior Publication Data
US 2022/0259831 A1      Aug. 18, 2022

(30) Foreign Application Priority Data

Sep. 30, 2019   (JP) ................................. 2019-180380

(51) Int. Cl.
*E02F 9/26*   (2006.01)
*E02F 9/20*   (2006.01)
(Continued)

(52) U.S. Cl.
CPC ............ *E02F 9/264* (2013.01); *E02F 9/2004* (2013.01); *E02F 9/2083* (2013.01); *E02F 9/24* (2013.01); *E02F 9/2296* (2013.01)

(58) Field of Classification Search
CPC ....... E02F 9/264; E02F 9/2004; E02F 9/2083; E02F 9/24; E02F 9/2296
See application file for complete search history.

(56) References Cited

U.S. PATENT DOCUMENTS 6,631,320 B1 * 10/2003 Holt ...................... E02F 9/2253
180/197
2014/0303879 A1 * 10/2014 Hyodo ................ F02N 11/0822
701/112

(Continued)

FOREIGN PATENT DOCUMENTS

DE      102 21 298 A1   11/2003
EP      3 333 035 A1    9/2017
(Continued)

OTHER PUBLICATIONS

The Office Action for the corresponding Chinese application No. 202080050779.1, issued on Sep. 21, 2022.
(Continued)

*Primary Examiner* — Dale Moyer
(74) *Attorney, Agent, or Firm* — Global IP Counselors, LLP

(57) ABSTRACT

The wheel loader includes a rear detection section, a state detection section, and a controller. The rear detection section detects rearward of the vehicle body when moving backward. The state detection section detects a state of the vehicle body. The controller brakes the vehicle body based on the detection of the state detection section and the detection of the rear detection section.

13 Claims, 11 Drawing Sheets

(51) Int. Cl.
*E02F 9/24* (2006.01)
*E02F 9/22* (2006.01)

(56) References Cited

U.S. PATENT DOCUMENTS

| | | | | |
|---|---|---|---|---|
| 2020/0315083 | A1* | 10/2020 | Mei | A01B 69/00 |
| 2021/0009116 | A1* | 1/2021 | Fujiyoshi | E02F 9/262 |
| 2021/0025135 | A1* | 1/2021 | Sakuta | E02F 9/2246 |

FOREIGN PATENT DOCUMENTS

| | | |
|---|---|---|
| JP | 8-218310 A | 8/1996 |
| JP | 2000-314104 A | 11/2000 |
| JP | 2007-253936 A | 10/2007 |
| JP | 2014-201442 A | 10/2014 |
| JP | 2017-177984 A | 10/2017 |
| JP | 2019-31823 A | 2/2019 |
| JP | 2019-108742 A | 7/2019 |
| KR | 10-2011-0117847 A | 10/2011 |
| WO | 2019/180843 A1 | 9/2019 |

OTHER PUBLICATIONS

The extended European search report for the corresponding European application No. 20870878.4, issued on May 16, 2023.
The International Search Report for the corresponding international application No. PCT/JP2020/034679, issued on Nov. 2, 2020.
"NIPPO / Wheel loader automatic stop system development / Obstacle handling with stereo camera" Jul. 8, 2016, 3rd page, Nikkan Kensetsu Kogyo Shimbun Online, Internet <URL: https://www.decn.co.jp/?p=72204>.

* cited by examiner

WORK MACHINE, AND METHOD FOR CONTROLLING WORK MACHINE

CROSS-REFERENCE TO RELATED APPLICATIONS

This application is a U.S. National stage application of International Application No. PCT/JP2020/034679, filed on Sep. 14, 2020. This U.S. National stage application claims priority under 35 U.S.C. § 119(a) to Japanese Patent Application No. 2019-180380, filed in Japan on Sep. 30, 2019, the entire contents of which are hereby incorporated herein by reference.

BACKGROUND

Technical Field

The present invention relates to a work machine and a method for controlling a work machine.

Background Art

In a wheel loader, which is an example of a work machine, an automatic stop system that detects an obstacle behind and automatically stops has been proposed.

For example, in "NIPPO/Wheel loader automatic stop system development/Obstacle handling with stereo camera" Jul. 8, 2016, 3rd page, Nikkan Kensetsu Kogyo Shimbun Online, Internet <URL: https://www.decn.co.jp/?p=72204>, a stereo camera is installed in a wheel loader, and a foot brake is activated when an obstacle is recognized while traveling backward.

SUMMARY

However, when working at a construction site, etc., the work machine is often in a relatively unstable state, and in the case of sudden braking is activated when traveling backward in such a state, the work machine may fall down and the work may be interrupted. In construction sites and the like, operators are often aware of surrounding obstacles because they are working carefully, and braking is activated every time an obstacle is detected when traveling backward, which reduces work efficiency.

It is an object of the present disclosure to provide a work machine and a method for controlling a work machine capable of improving work efficiency.

A work machine according to this aspect includes a state detection section, a rear detection section, and a controller. The rear detection section detects rear of a vehicle body. The state detection section detects a state of the vehicle body. The controller brakes the vehicle body based on detection of the rear detection section and detection of the state detection section.

A method for controlling a work machine according to this aspect includes a rear detection step, a state detection step, and a control step. The rear detection step detects rear of the vehicle body. The state detection step detects a state of the vehicle body. The control step brakes the vehicle body based on detection result by the rear detection step and detection result by the state detection step.

According to the present disclosure, it is possible to provide a work machine and a method for controlling a work machine capable of improving work efficiency.

DESCRIPTION OF EMBODIMENTS

A wheel loader as an example of the work machine according to the present disclosure will be described below with reference to the drawings.

(Overview of Wheel Loader)

Figure 1:
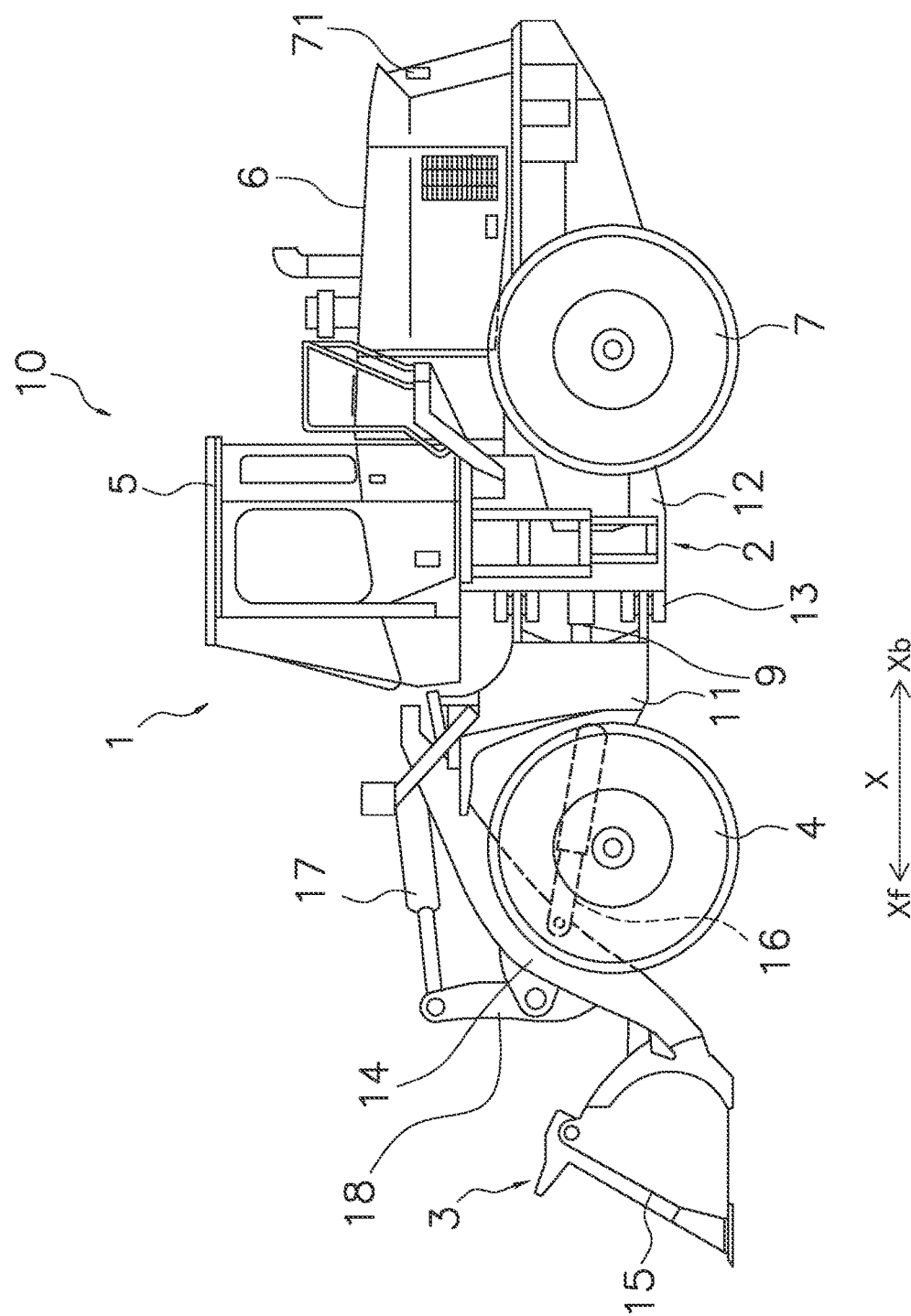
FIG. 1 is a side view of a wheel loader in the embodiment according to the present disclosure.

FIG. 1 is a schematic view showing a configuration of a wheel loader 10 (an example of a work machine) of the present embodiment. The wheel loader 10 of the present embodiment includes a vehicle body frame 2, a work implement 3, a pair of front tires 4, a cab 5, an engine room 6, a pair of rear tires 7, and a steering cylinder 9 in a vehicle body 1. In the following description, "front", "rear", "right", "left", "top", and "bottom" indicate directions based on the state of looking forward from the driver's seat. In addition, "vehicle width direction" and "left-right direction" are synonymous. In FIG. 1, the front-rear direction is indicated by X, the front direction is indicated by Xf, and the rear direction is indicated by Xb.

The wheel loader 10 uses work implement 3 to perform earth and sand loading work and the like.

The vehicle body frame 2 is a so-called articulated type, and includes a front frame 11, a rear frame 12, and a connecting shaft part 13. The front frame 11 is arranged in front of the rear frame 12. The connecting shaft part 13 is provided at the center in the vehicle width direction, and connects the front frame 11 and the rear frame 12 so as to be swingable to each other. The pair of front tires 4 are attached to the left and right sides of the front frame 11. Further, a pair of rear tires 7 are attached to the left and right sides of the rear frame 12.

The work implement 3 is driven by a hydraulic fluid from a work implement pump (not illustrated). The work implement 3 includes a boom 14, a bucket 15, a lift cylinder 16, and a bucket cylinder 17. The boom 14 is attached to the front frame 11. The bucket 15 is attached to the tip of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The boom 14 swings up and down due to the expansion and contraction of the lift cylinder 16. One end of the bucket cylinder 17 is attached to the front frame 11, and the other end of the bucket cylinder 17 is attached to the bucket 15 via the bell crank 18. As the bucket cylinder 17 expands and contracts, the bucket 15 swings up and down.

The cab 5 is mounted on the rear frame 12, and a handle for a steering operation, a lever for operating the work implement 3, various display devices, and the like are arranged inside. The engine room 6 is located on the rear side of the cab 5 and on the rear frame 12, and houses the engine 31.

Figure 2:
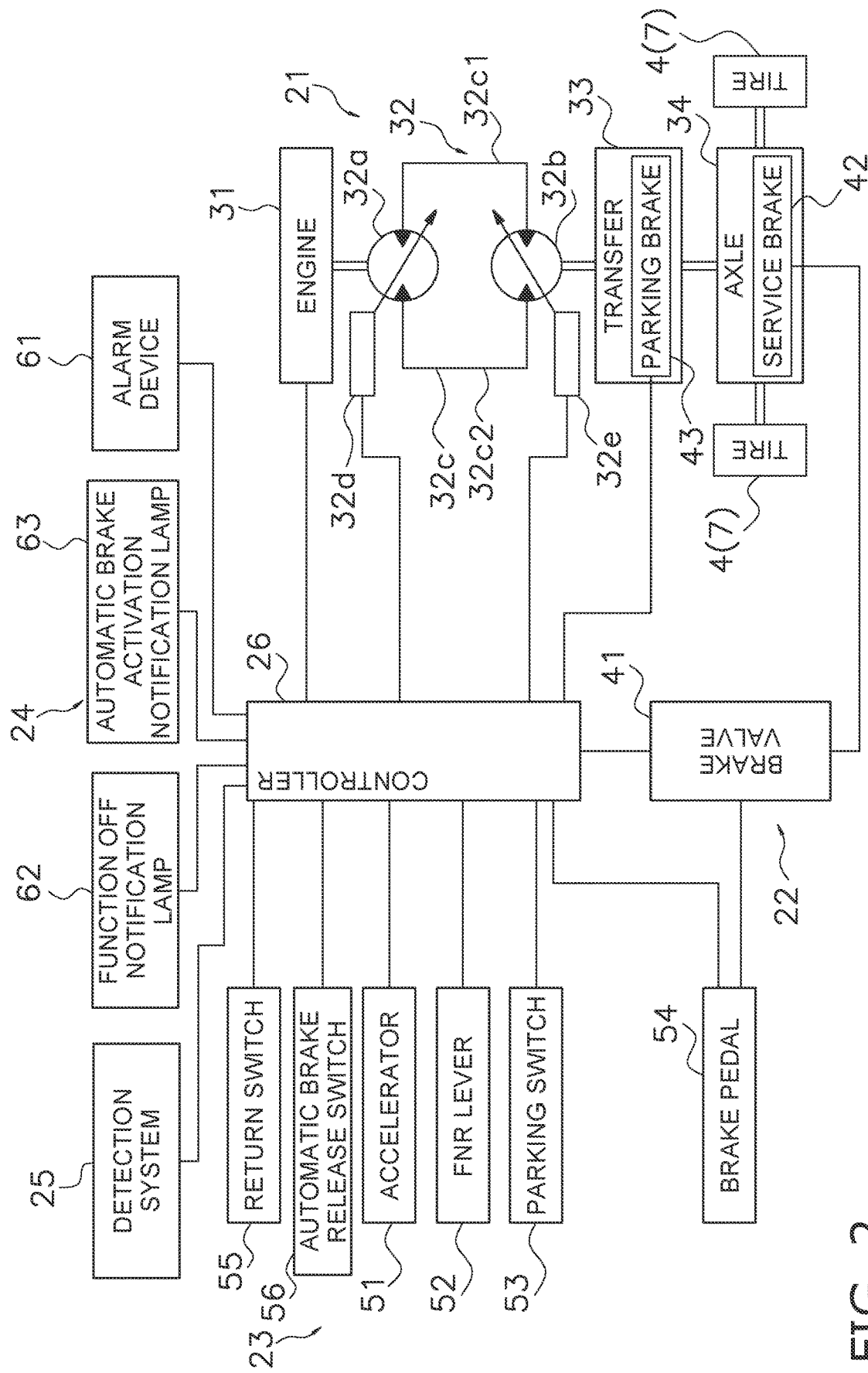
FIG. 2 is a block diagram showing a control system for the wheel loader in FIG. 1.

FIG. 2 is a block diagram showing a configuration of a control system of the wheel loader 10.

The wheel loader 10 includes a drive system 21, a braking system 22, an operation system 23, a notification system 24, a detection system 25, and a controller 26 (an example of a controller).

The drive system 21 drives the wheel loader 10. The braking system 22 brakes while the wheel loader 10 is traveling. The operation system 23 is operated by the operator. The drive system 21 and the braking system 22 are activated based on the operation of the operation system 23 by the operator. The notification system 24 notifies the operator based on the operation of the operation system 23 or the detection result by the detection system 25. The detection system 25 detects the state of the vehicle body 1 and obstacles behind the vehicle body 1. The controller 26 operates the drive system 21, the braking system 22, and the notification system 24 based on the operator's operation for the operation system 23 and the detection by the detection system 25.

(Drive System 21)

The drive system 21 includes an engine 31, an HST 32, a transfer 33, an axle 34, the front tires 4, and the rear tires 7.

The engine 31 is, for example, a diesel engine, and the driving force generated by the engine 31 drives the pump 32a of the HST (Hydro Static Transmission) 32.

The HST 32 includes a pump 32a, a motor 32b, and a hydraulic circuit 32c that connects the pump 32a and the motor 32b. The pump 32a is a swash plate type variable displacement pump, and the angle of the swash plate can be changed by a solenoid 32d. The pump 32a is driven by the engine 31 to discharge the hydraulic fluid. The discharged hydraulic fluid is sent to the motor 32b through the hydraulic circuit 32c. The motor 32b is a swash plate type pump, and the angle of the swash plate can be changed by a solenoid 32e. The hydraulic circuit 32c includes a first drive circuit 32c1 and a second drive circuit 32c2. Hydraulic fluid is supplied from the pump 32a to the motor 32b via the first drive circuit 32c1, so that the motor 32b is driven in one direction (for example, in the forward direction). Hydraulic fluid is supplied from the pump 32a to the motor 32b via the second drive circuit 32c2, so that the motor 32b is driven in another direction (for example, in the backward direction). The discharge direction of hydraulic fluid to the first drive circuit 32c1 or the second drive circuit 32c2 can be changed by the solenoid 32d.

The transfer 33 distributes the output from the engine 31 to the front and rear axles 34.

A pair of front tires 4 are connected to the front axle 34, and rotate with the distributed output from the engine 31. Further, a pair of rear tires 7 are connected to the rear axle 34, and rotate with the distributed output from the engine 31.

(Brake System 22)

The braking system 22 includes a brake valve 41, a service brake 42, and a parking brake 43.

The brake valve 41 is, for example, an EPC valve (Electric Proportional Control Valve), and the opening degree for the hydraulic fluid sent to the service brake 42 can be adjusted.

The service brake 42 is provided on the axle 34. The service brake 42 is a hydraulic brake. For example, when the opening degree of the brake valve 41 is large, the braking force becomes strong, and when the opening degree of the brake valve 41 is small, the braking force becomes weak.

As a function of the automatic brake, the brake valve 41 is driven by an instruction from the controller 26 even when the brake pedal 54, which will be described later, is not operated, and the service brake 42 is activated.

The parking brake 43 is provided on the transfer 33. As the parking brake 43, for example, a wet multi-stage brake that can switch between a braking state and a non-braking state, a disc brake, and the like can be used.

(Operation System 23)

The operation system 23 includes an accelerator 51, an FNR lever 52, a parking switch 53, a brake pedal 54, a return switch 55, and an automatic brake release switch 56.

The accelerator 51 is provided in the cab 5. The operator operates the accelerator 51 to set the throttle opening degree. The accelerator 51 generates an opening signal indicating an accelerator operation amount and transmits the signal to the controller 26. The controller 26 controls the rotation speed of the engine 31 based on the transmitted signal.

When the accelerator 51 is turned off, the fuel supply to the engine 31 is stopped, the swash plates of the pump 32a and the motor 32b are controlled to serve as traveling resistance, and the internal inertia acts, so that the braking force (weak braking force, which will be described later) is generated.

The FNR lever 52 is provided in the cab 5. The FNR lever 52 can be in a forward, neutral, or reverse position. An operation signal indicating the position of the FNR lever 52 is transmitted to the controller 26, and the controller 26 controls the solenoid 32d to switch between forward and backward. When the FNR lever 52 is in the neutral position, the controller 26 controls the solenoids 32d and 32e, and controls the swash plates of the pump 32a and the motor 32b so as to have traveling resistance. As a result, the internal inertia works, so that a braking force (weak braking force, which will be described later) is generated.

The automatic brake also includes the braking force generated by the control of turning off the accelerator 51 and the braking force generated by the control of setting the FNR lever 52 to the neutral position.

The parking switch 53 is provided in the cab 5 and can switch the state between on and off, and transmits a signal indicating the state to the controller 26. The controller 26 sets the parking brake 43 in a braking state or a non-braking state based on the transmitted signal.

The brake pedal 54 is provided in the cab 5. The brake pedal 54 adjusts the opening degree of the brake valve 41. Further, the brake pedal 54 transmits the operation amount to the controller 26.

The return switch 55 is operated by an operator to return from the stopped state after the vehicle body 1 is stopped by the automatic brake described later.

The automatic brake release switch 56 releases the automatic brake function and is set so that the automatic brake function does not work.

(Notification System 24)

The notification system 24 includes an alarm device 61 (an example of a second notification section), a function OFF notification lamp 62 (an example of a first notification section), and an automatic brake activation notification lamp 63.

The alarm device 61 gives an alarm to the operator when an obstacle is detected behind the vehicle body 1 based on the detection of the rear detection section 71 of the detection system 25 described later. The alarm device 61 may have, for example, a lamp and turn on the lamp. Further, the alarm device 61 may have a speaker and sound a sound, not limited to the lamp. Further, the alarm may be displayed on a display panel such as a monitor.

The function OFF notification lamp 62 lights up, for example, to notify the operator when the automatic brake function is suppressed (described later) or stopped at the judgment of the controller 26. Further, the function OFF notification lamp 62 lights up, for example, to notify the operator when the automatic brake release switch 56 is operated by the operator's judgment and the automatic brake function is in the OFF state. Further, when the function OFF notification lamp 62 is turned off, it indicates that the automatic brake function can be activated. Further, the function OFF notification lamp 62 does not have to be limited to the lamp, and may make a sound. Further, the notification may be displayed on a display panel such as a monitor.

The automatic brake activation notification lamp 63 notifies the operator that the automatic brake activates, and notifies that the return operation by the return switch 55 is necessary. When the return switch 55 is operated and the automatic brake is released, the automatic brake activation notification lamp 63 turns off.

The automatic brake activation notification lamp 63 is not limited to the lamp, and may make a sound. Further, the notification may be displayed on a display panel such as a monitor.

As described above, the means for notifying the operator of information by the notification system 24 can be appropriately selected such as a lamp, a sound, and a monitor.

(Detection System 25)

Figure 3A:
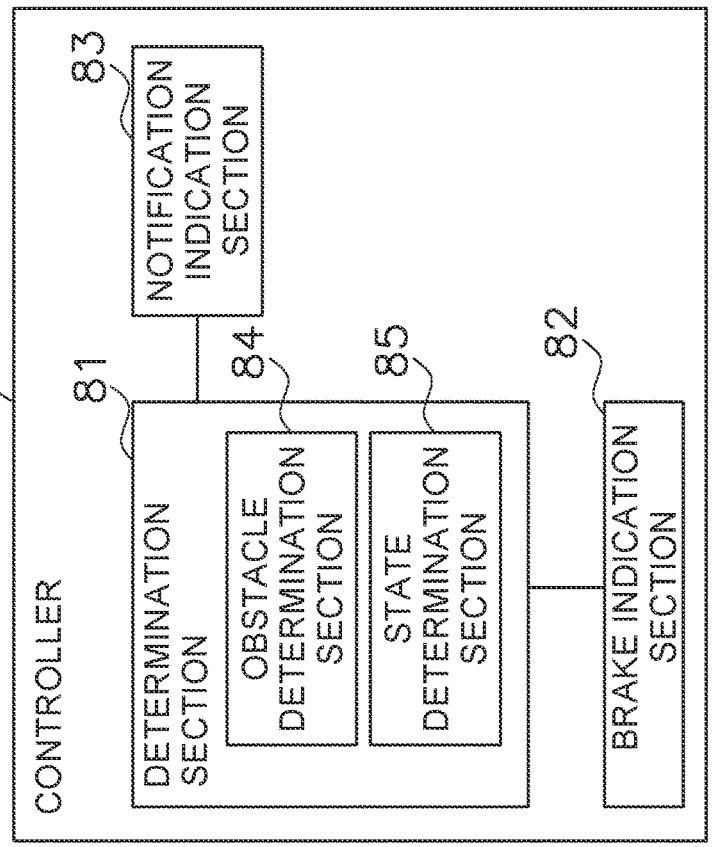
FIG. 3A is a block diagram showing a detection system in FIG. 2.

FIG. 3A is a block diagram showing the detection system 25.

The detection system 25 includes a rear detection section 71 and a state detection section 72.

The rear detection section 71 detects an obstacle behind the vehicle body 1. The rear detection section 71 is attached to the rear end of the vehicle body 1 as illustrated in FIG. 1, but is not limited to the rear end.

The rear detection section 71 includes, for example, a millimeter wave radar. A receiving antenna detects how the millimeter-wave band radio waves emitted from a transmitting antenna are reflected on a surface of an obstacle and returned, and the distance to the object can be measured. The detection result by the state detection section 72 is transmitted to the controller 26, and the controller 26 can determine that an obstacle exists within a predetermined range when traveling backward. It should be noted that what the rear detection section 71 includes is not limited to the millimeter wave radar, and may be, for example, a camera or the like.

The state detection section 72 detects the state of the vehicle body 1. The detection by the state detection section 72 is performed in order that the controller 26 determines whether the state of the vehicle body 1 is a state requiring falling down prevention (an example of a state in which a vehicle body becomes unstable) or a state in which it is possible to stop without requiring falling down prevention when the automatic brake is activated with the preset braking force of the preset strength while traveling backward.

Further, the detection by the state detection section 72 is performed in order that the controller 26 determines whether the state of the vehicle body 1 is a state requiring falling down prevention (an example of a state in which a vehicle body becomes unstable) or a state in which it is possible to stop without requiring falling down prevention when the automatic brake is activated with a braking force weaker than the preset braking force of the preset strength while traveling backward.

The state detection section 72 includes various sensors. The state detection section 72 detects, for example, (first state) work implement posture, (second state) load state, (third state) articulate angle as an example of the posture of the vehicle body, (fourth state) the road surface condition, and speed.

Figure 4:
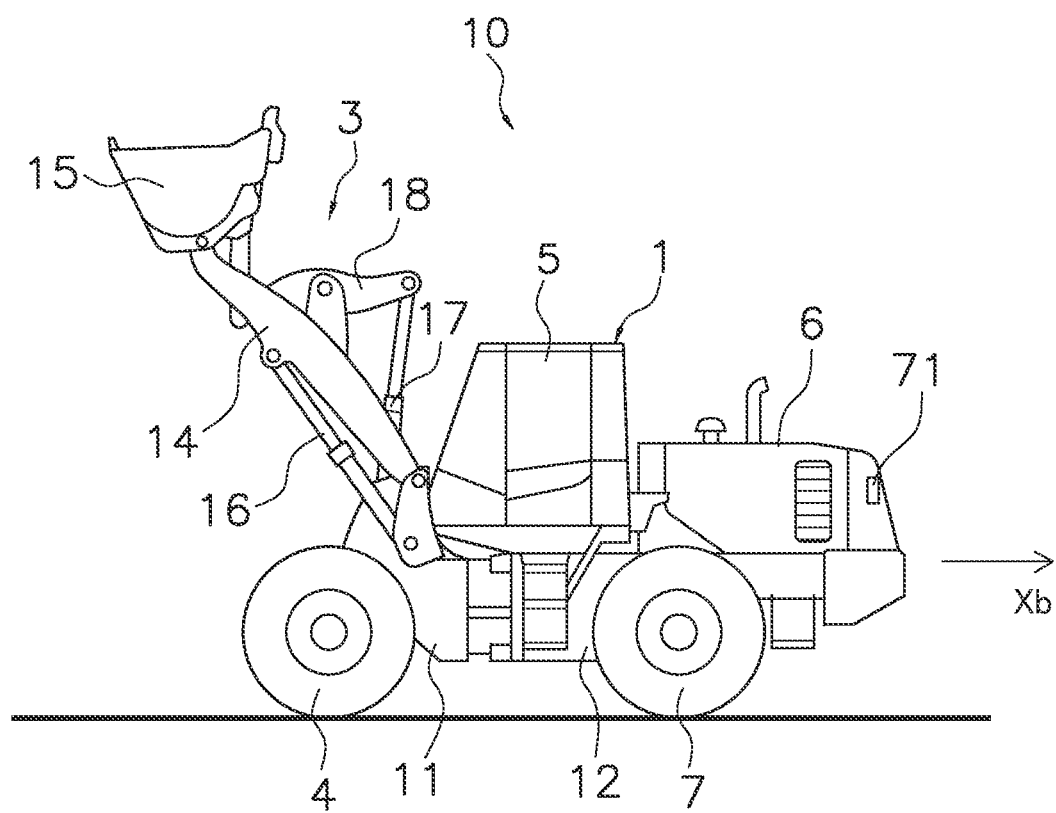
FIG. 4 is a side view of a wheel loader for explaining a first state.

FIG. 4 is a view showing that the wheel loader 10 is in a work implement posture (first state) such that it is necessary to prevent falling down.

The state detection section 72 includes, for example, a boom angle sensor 72a and a speed sensor 72g in order to detect the posture (first state) of the work implement. When it is detected that the boom 14 is higher than the predetermined threshold value with the boom angle sensor 72a and that the speed in backward traveling is equal to or higher than the predetermined threshold value with the speed sensor 72g, the determination section 81 of the controller 26 determines that it is necessary to prevent the vehicle from falling down due to braking with the preset braking force or the weak braking force. The posture of work implement 3 may be determined not only by the boom angle sensor 72a but also by providing a camera and performing image analysis. It is preferable to appropriately change the predetermined threshold value used for the determination between braking with the preset braking force and braking with a weak braking force. This also applies to (second state), (third state), and (fourth state), which will be described later.

Figure 5:
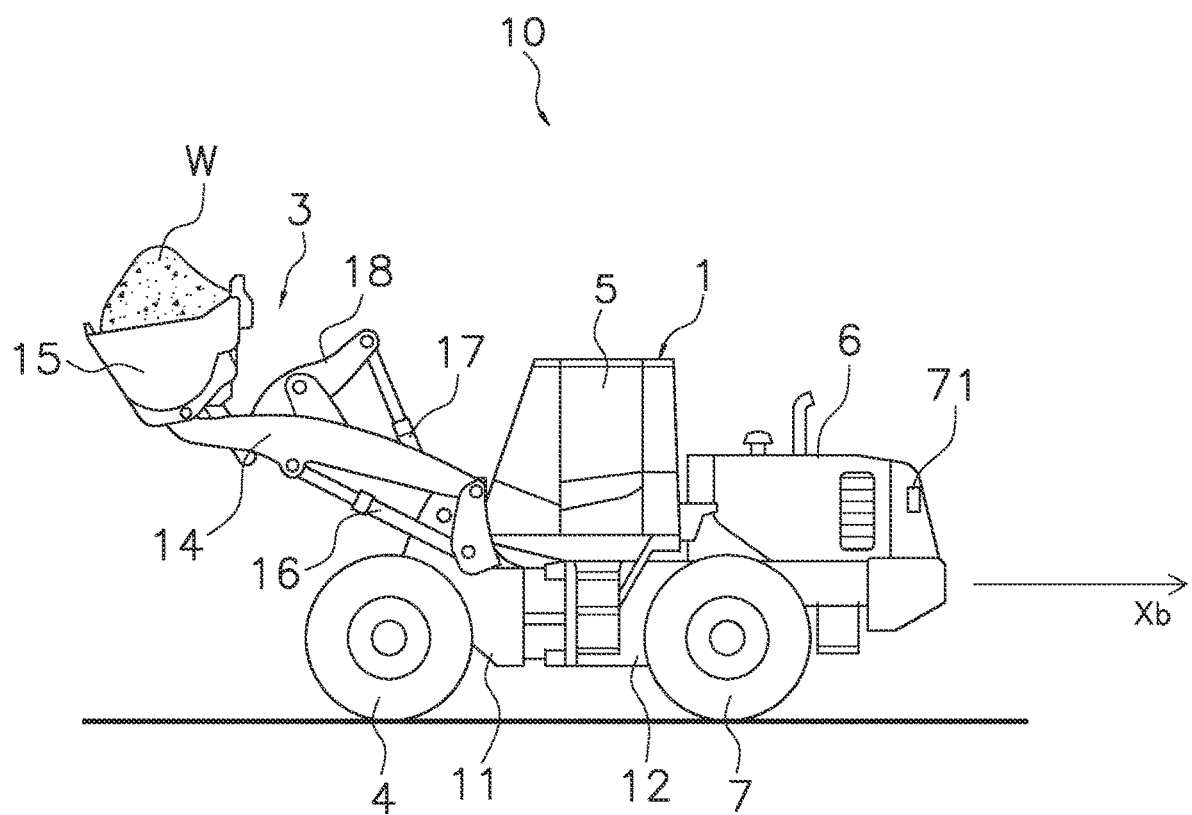
FIG. 5 is a side view of a wheel loader for explaining a second state.

FIG. 5 is a view showing that the wheel loader 10 is in a loaded state (second state) in which it is necessary to prevent falling down.

The state detection section 72 includes the pressure sensor 72b for detecting the pressure of the lift cylinder 16, the boom angle sensor 72a, and a bell crank angle sensor 72d for detecting whether or not the bucket 15 is in the tilt state in order to detect the state (second state) of the load. Whether or not the bucket 15 is in the tilted state is determined by the length of the bucket cylinder 17. From the boom angle by the boom angle sensor 72a and the bell crank angle by the bell crank angle sensor 72d, the length of the bucket cylinder 17 is calculated based on the table stored in advance, and it is possible to detect whether or not the bucket 15 is in the tilted state.

When it is detected that a load W is loaded with equal to or greater than a predetermined value with the pressure sensor 72b, that the boom 14 is raised above a predetermined threshold value, that the bucket 15 is in the tilted state, and that the speed in traveling backward is equal to or higher than the predetermined threshold value with the speed sensor 72g, the determination section 81 of the controller 26 determines that it is necessary to prevent the vehicle from falling down due to braking with the preset braking force or the weak braking force. In addition, in order to detect the tilt state, a sensor (proximity sensor or the like) capable of detecting the position of the work implement such as the bucket 15 may be used instead of using the bell crank angle sensor 72*d*, and it is possible to set the sensor arbitrarily. Further, in order to detect the state of the load, a camera may be provided to perform image analysis.

Figure 6:
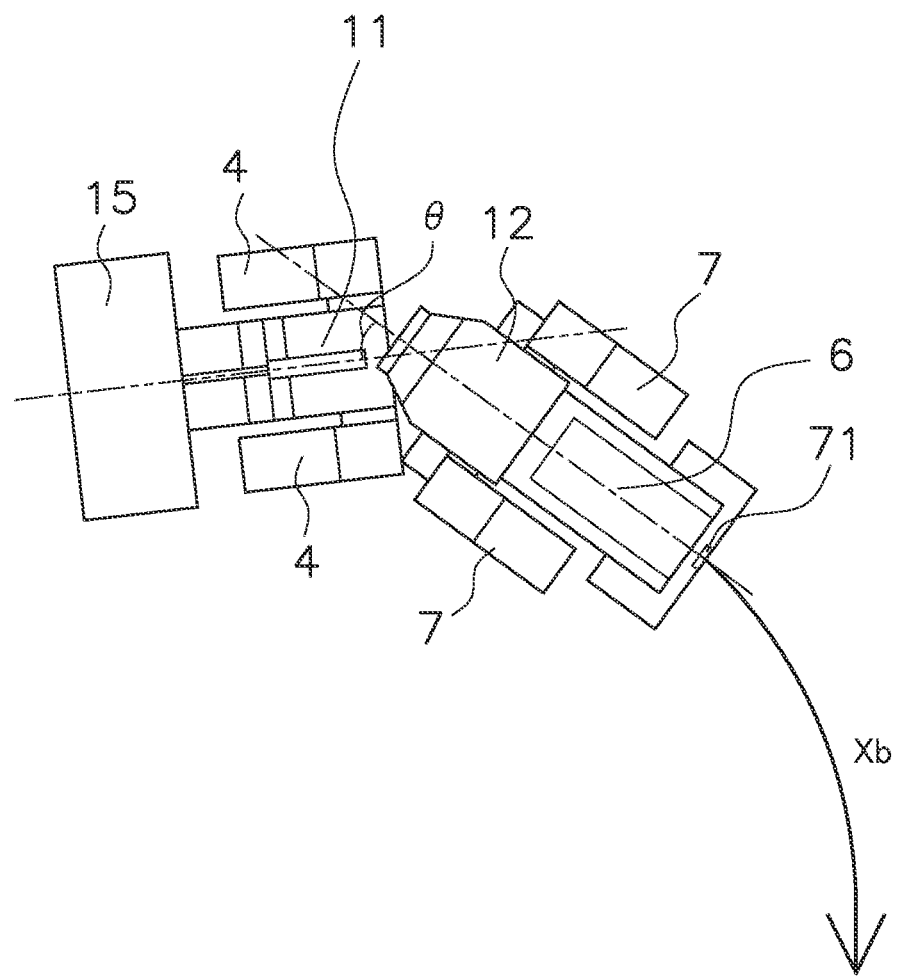
FIG. 6 is a plan view of a wheel loader for explaining a third state.

FIG. 6 is a view showing that the wheel loader 10 is in a state (third state) of an articulate angle such that it is necessary to prevent falling down.

The state detection section 72 includes an articulate angle sensor 72*e* for detecting the articulate angle θ (third state). The articulate angle sensor 72*e* detects the tilt angle of the front frame 11 with respect to the rear frame 12.

When it is detected that the detection value θ is equal to or more than a predetermined angle with the articulate angle sensor 72*e*, and that the speed in traveling backward is equal to or higher than the predetermined threshold value with the speed sensor 72*g*, the determination section 81 of the controller 26 determines that it is necessary to prevent the vehicle from falling down due to braking with the preset braking force or the weak braking force.

Figure 7:
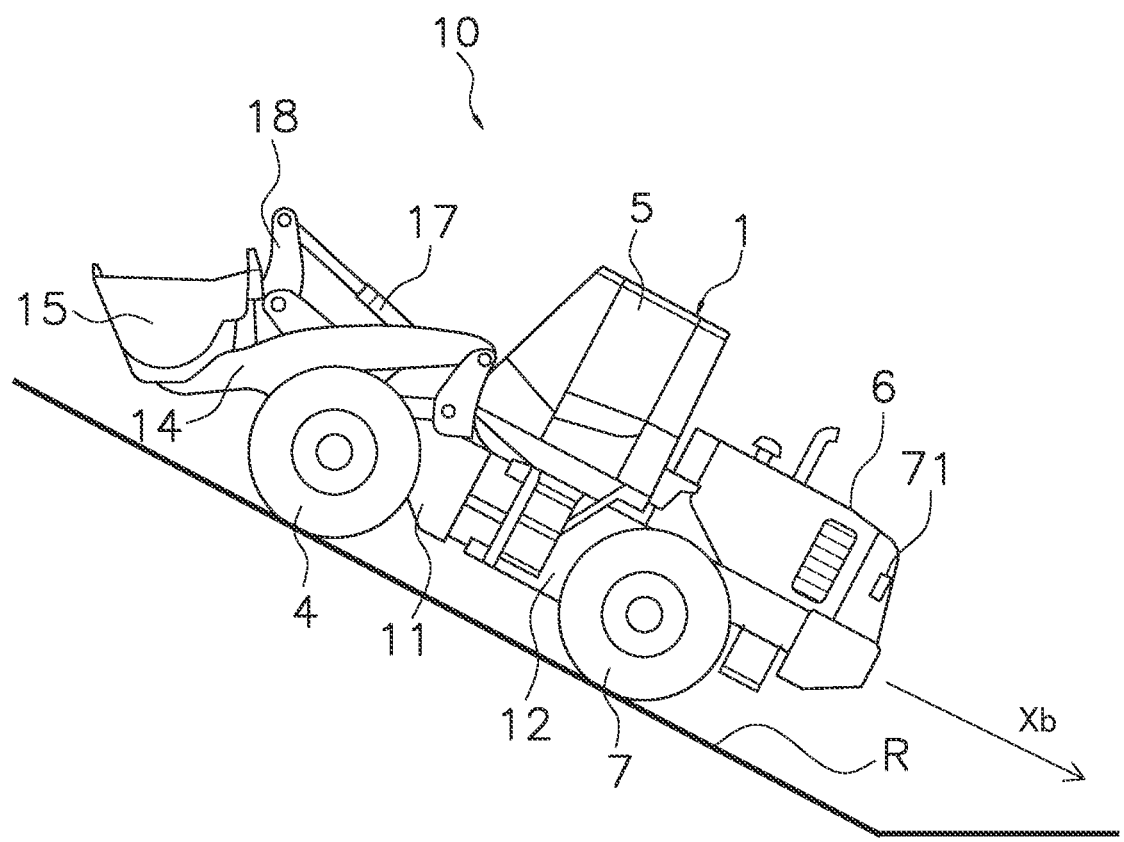
FIG. 7 is a side view of a wheel loader for explaining a fourth state.

FIG. 7 is a view showing that the state of the road surface condition (fourth state) is such that it is necessary to prevent falling down.

FIG. 7 shows a state in which the wheel loader 10 is arranged on the inclined surface R.

The state detection section 72 includes a vehicle body angle sensor 72*f*. The determination section 81 of the controller 26 can determine that the wheel loader 10 is arranged on the inclined road surface R based on the detection value detected by the vehicle body angle sensor 72*f*.

When it is detected that the inclination angle is equal to or greater than the predetermined angle with the vehicle body angle sensor 72*f* and that the speed in traveling backward is equal to or greater than the predetermined threshold value with the speed sensor 72*g*, the determination section 81 of the controller 26 determines that it is necessary to prevent the vehicle from falling down due to braking with the preset braking force or the weak braking force. An IMU (Inertial Measurement Unit) may be used instead of the vehicle body angle sensor 72*f*.

(Controller 26)

The controller 26 includes a processor such as a CPU (Central Processing Unit), a main memory including a non-volatile memory, such as a ROM (Read Only Memory), and a volatile memory, such as a RAM (Random Access Memory), and a storage. The controller 26 reads the program stored in the storage, expands the program on the main memory, and executes a predetermined process according to the program. The program may be delivered to the controller 26 via the network.

Figure 3B:
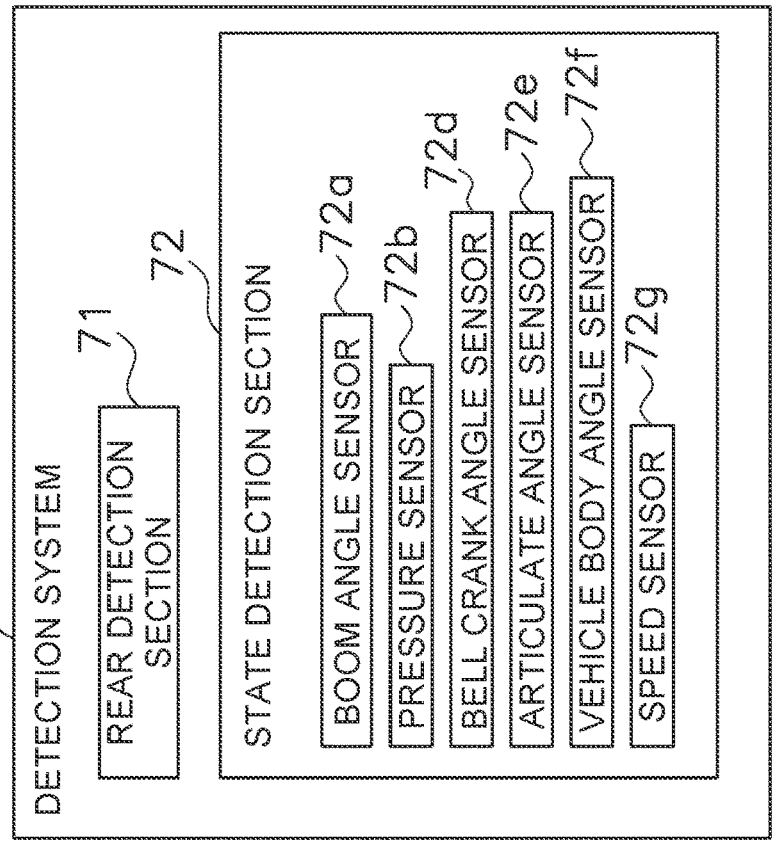
FIG. 3B is a block diagram showing a configuration of a controller in FIG. 2.

FIG. 3B is a block diagram showing the configuration of the controller 26.

The controller 26 includes a determination section 81, a brake instruction section 82, and a notification instruction section 83. The number of controllers 26 is not limited to one, and a plurality of controllers 26 may be provided, and the functions of the determination section 81, the brake instruction section 82, and the notification instruction section 83 may also be provided separately for the plurality of controllers.

The determination section 81 makes a determination regarding the control of the automatic brake. The determination section 81 includes an obstacle determination section 84 and a state determination section 85.

The obstacle determination section 84 determines whether or not there is an obstacle when traveling backward. "Traveling backward" means that the tires are turning backwards. The obstacle determination section 84 detects that the vehicle body 1 is in the state of traveling backward, for example, by the front tire 4 or the rear tire 7 rotating backward, or by the FNR lever 52 being in the reverse position. The obstacle determination section 84 determines that an obstacle exists when receiving the obstacle detection information within a predetermined range from the rear detection section 71 of the detection system 25 in detecting the state of traveling backward.

The state determination section 85 determines whether or not the wheel loader 10 is in the states (first state to fourth state) illustrated in FIGS. 4 to 7, and determines whether or not it is necessary to prevent falling down when braking with the preset braking force or the weak braking force is activated in traveling backward based on the speed.

The brake instruction section 82 controls automatic brake based on the determination result of the obstacle determination section 84 and the determination result of the state determination section 85. The automatic brake in the present specification is to automatically activate a braking force to the vehicle body 1 based on the determination result of the obstacle determination section 84 and the determination result of the state determination section 85, and as will be described later, it is not limited to the braking force of the service brake 42.

When the obstacle determination section 84 determines that an obstacle exists, and the state determination section 85 determines that the state of the vehicle body 1 is a state in which it is not necessary to prevent falling down in a case of activating the preset braking force, the brake instruction section 82 stops the fuel supply to the engine 31 and drives the service brake 42 by operating the brake valve 41 to stop the vehicle body 1.

Figure 8:
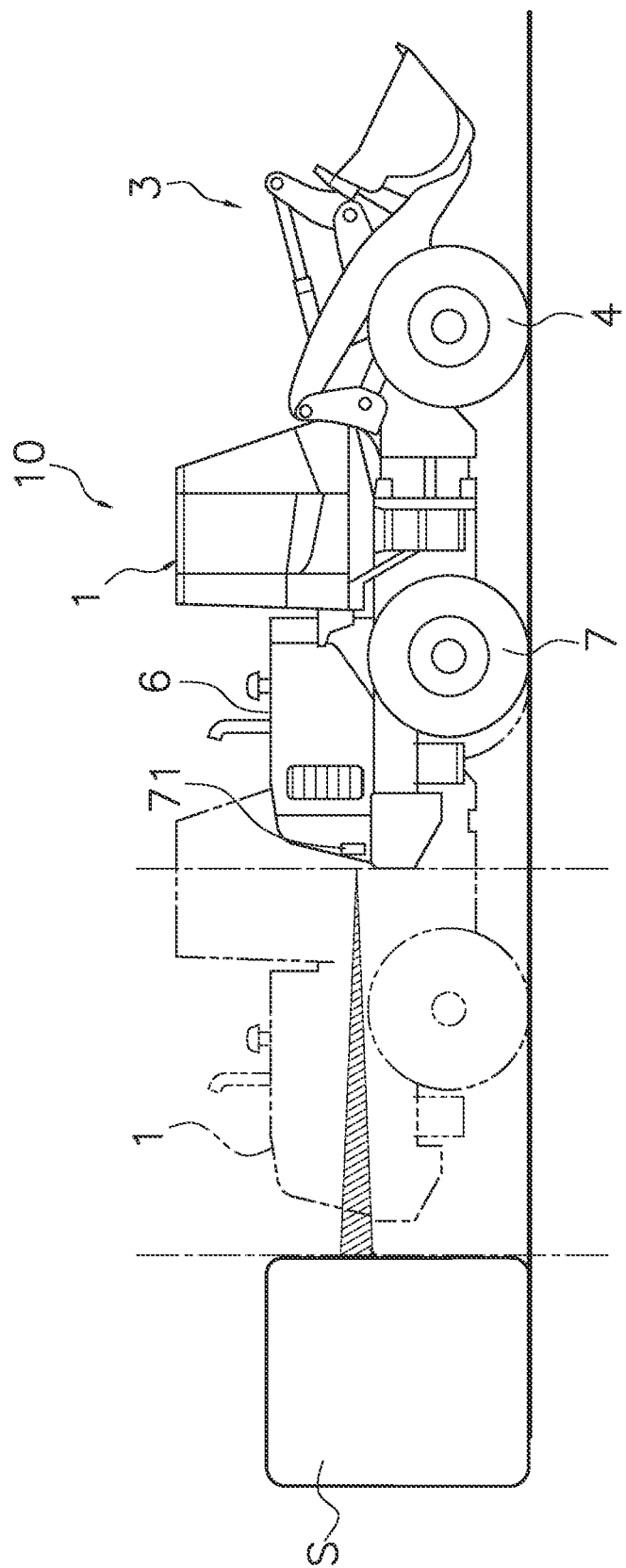
FIG. 8 is a side view for explaining automatic brake by obstacle detection in the wheel loader in FIG. 1.

FIG. 8 is a view showing a state in which the obstacle S is detected when traveling backward and the vehicle body 1 is stopped. When the state of the vehicle body 1 is stable and it is not necessary to prevent falling down in case where a preset braking force (which can be said to be a braking force) causing the vehicle body 1 to stop in front of the obstacle S is activated by operating the service brake 42, it is possible to stop the vehicle body 1 by activating the preset brake force with the service brake 42. At this time, the opening degree of the brake valve 41 is set large in order to activate the preset braking force that stops the vehicle body 1 in front of the obstacle S. In FIG. 8, the stopped vehicle body 1 is indicated by a chain double-dashed line.

In the automatic brake with the preset braking force, the vehicle body 1 may not be braked by the service brake 42 as described above, and the parking brake 43 may be operated. In this case, when the obstacle determination section 84 determines that the obstacle S exists, and the state determination section 85 determines that the state of the vehicle body 1 is a state in which it is not necessary to prevent falling down in a case of activating the preset braking force, the brake instruction section 82 stops the fuel supply to the engine 31. Then, the brake instruction section 82 controls the parking brake 43 to brake the vehicle body 1.

Further, when the obstacle determination section 84 determines that an obstacle exists, and the state determination section 85 determines that the state of the vehicle body 1 is a state in which it is not necessary to prevent falling down in a case of activating the weak braking force, the brake instruction section 82 stops the fuel supply to the engine 31, sets the opening degree of the brake valve 41 to be small, and controls the service brake 42 so that a weak braking force is activated. Here, the weak braking force is set smaller than the preset braking force. Activating the weak braking force corresponds to an example of suppressing the braking force of the automatic brake.

The weak braking force is not limited to being generated by adjusting the opening degree of the brake valve 41, but is also generated when the operator simply turns off the accelerator 51. When the accelerator 51 is turned off, the fuel supply to the engine 31 is stopped, and the swash plates of the pump 32a and the motor 32b are controlled to serve as traveling resistance, so that the weak braking force is activated.

The brake instruction section 82 may activate the weak braking force by controlling like a case in which the operator turns off the accelerator 51.

That is, when the obstacle determination section 84 determines that an obstacle exists, and the state determination section 85 determines that the state of the vehicle body 1 is a state in which it is not necessary to prevent falling down in a case of activating the weak braking force, the brake instruction section 82 stops the fuel supply to the engine 31, for example, controls the swash plates of the pump 32a and the motor 32b so as to serve as a traveling resistance, and activates the weak braking force.

The weak braking force is also activated by the operator operating the FNR lever 52 so as to be in the neutral position. Therefore, when the obstacle determination section 84 determines that an obstacle exists, and the state determination section 85 determines that the state of the vehicle body 1 is a state in which it is not necessary to prevent falling down in a case of activating the weak braking force, the brake instruction section 82 controls like a case in which the operator operates the FNR lever 52 so as to be in the neutral position without executing the control of activating the preset braking force. As a result, the swash plates of the pump 32a and the motor 32b are controlled to serve as traveling resistance, and a weak braking force is exerted. Since it is possible to apply such a weak braking force, the posture can be stabilized even in an unstable state.

Further, when the obstacle determination section 84 determines that an obstacle exists, and the state determination section 85 determines that the state of the vehicle body 1 is a state in which it is necessary to prevent falling down in a case of activating the weak braking force, the controller 26 does not activate the automatic brake.

The notification instruction section 83 activates the alarm device 61 when the obstacle determination section 84 determines that the obstacle S exists.

Further, when the obstacle determination section 84 determines that an obstacle exists, and the state determination section 85 determines that the state of the vehicle body 1 is a state in which it is necessary to prevent falling down in a case of activating the preset braking force, the notification instruction section 83 turns on the function OFF notification lamp 62 indicating that the function for activating the preset braking force is turned off.

Further, when the return switch 55 is operated by the operator after the vehicle body 1 is stopped by the automatic brake and the automatic brake is released, the notification instruction section 83 turns on the automatic brake activation notification lamp 63 for notifying the operator of the release. Further, the notification instruction section 83 turns on the function OFF notification lamp 62 when the operator operates the automatic brake release switch 56 to turn off the function of activating the preset braking force.

<Operation>

Next, the control operation of the wheel loader 10 of the present embodiment will be described.

Figure 9:
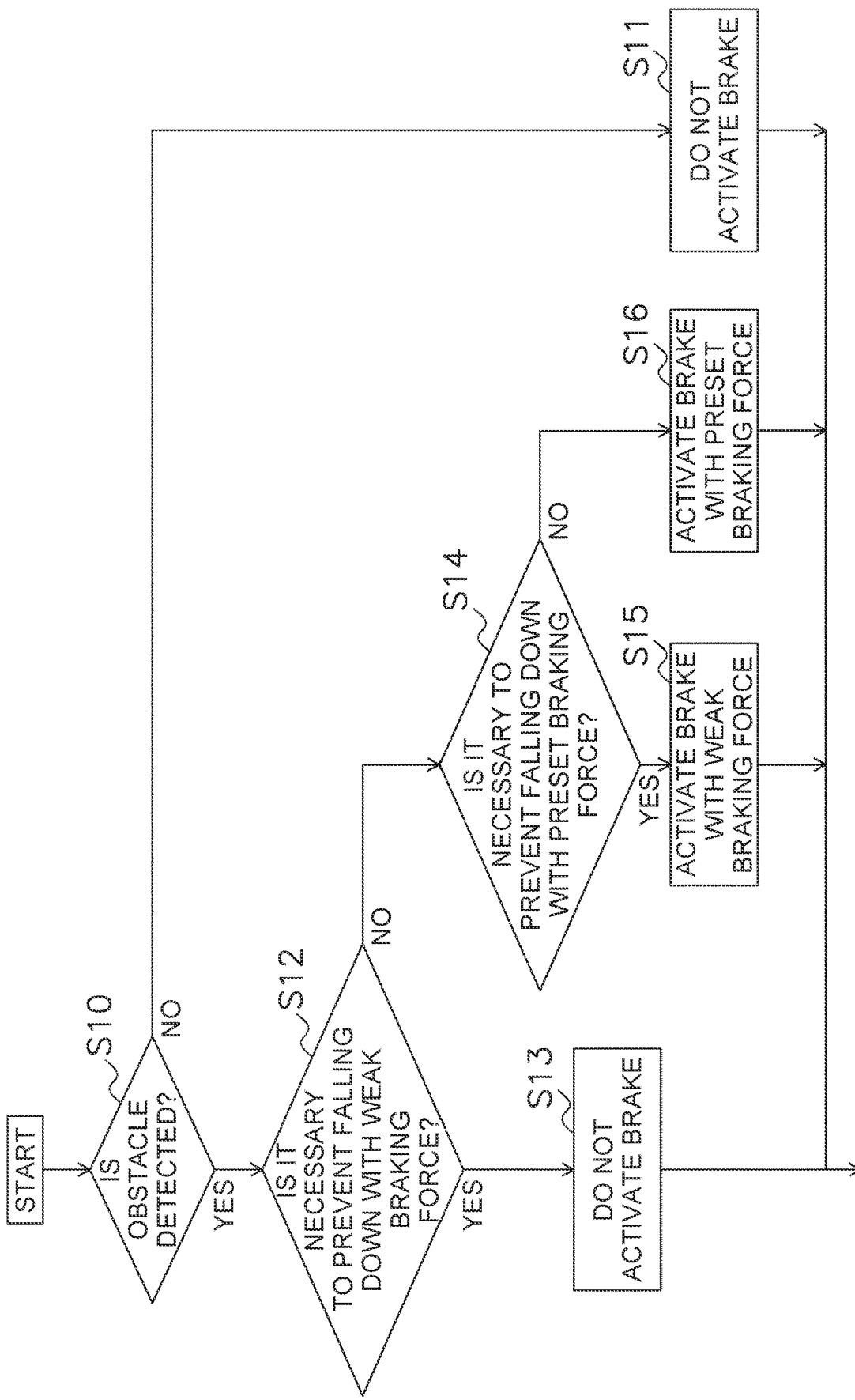
FIG. 9 is a flow chart showing a control operation of the wheel loader in the embodiment according to the present disclosure.

FIG. 9 is a flow chart showing a control operation regarding to obstacle detection of the wheel loader 10 of the present embodiment.

First, in step S10, the obstacle determination section 84 of the controller 26 determines whether or not an obstacle is detected when the vehicle body 1 moves backward. The obstacle determination section 84 detects that the vehicle body 1 is in the state of moving backward, for example, by the front tire 4 or the rear tire 7 rotating rearward, or the FNR lever 52 being in the reverse position. When the obstacle determination section 84 receives the detection information of an obstacle within a predetermined range from the rear detection section 71 of the detection system 25 in the state of detecting that the backward travel is being performed, the obstacle determination section 84 determines that an obstacle exists.

When it is not determined in step S10 that an obstacle exists, the controller 26 ends without activating the automatic brake in step S11.

When it is determined in step S10 that an obstacle exists, in step S12, the state determination section 85 determines whether or not it is necessary to prevent falling down in a case of activating the weak braking force.

The state determination section 85 acquires the state of the vehicle body 1 from the boom angle sensor 72a, the pressure sensor 72b, the bell crank angle sensor 72d, the articulate angle sensor 72e, the vehicle body angle sensor 72f, and the speed sensor 72g of the state detection section 72. And the state determination section 85 determines whether or not the state of the vehicle body 1 corresponds to the above-mentioned first state to fourth state requiring falling down prevention.

When it is determined in step S12 that the state of the vehicle body 1 is a state requiring falling down prevention in a case of activating the weak braking force, the controller 26 ends the control without activating the braking force in step S13.

When it is determined in step S12 that the state of the vehicle body 1 is a state in which it is not necessary to prevent falling down in the case of activating the weak braking force, the state determination section 85 determines whether or not the state of the vehicle body 1 is the state requiring falling down prevention in the case of activating the preset braking force. The preset braking force is the above-mentioned strong braking force that is capable of making the vehicle body 1 stop before the obstacle S.

When it is determined in step S14 that the state of the vehicle body 1 is a state in which it is necessary to prevent falling down in the case of activating the preset braking force, the brake instruction section 82 of the controller 26 stops the fuel supply to the engine 31 and controls the service brake 42 so as to activate the weak braking force by setting the opening degree of the brake valve to be small in step S15, and the control ends. As described above, the weak braking force may be generated by stopping the fuel supply to the engine 31 and controlling the swash plates of the pump 32a and the motor 32b to serve as traveling resistance.

When it is determined in step S14 that the state of the vehicle body 1 is a state in which it is not necessary to prevent falling down in the case of activating the preset braking force, the brake instruction section 82 of the controller 26 stops the fuel supply to the engine 31 by releasing the accelerator 51 and operates the service brake 42 with the preset braking force by operating the brake valve 41 in step S16 and the vehicle body 1 stops. In this way, the control ends. As described above, the parking brake 43 may be operated to generate the preset braking force.

As described above, it is possible to brake the vehicle body 1 by activating the preset braking force or the weak braking force within the range where it is not necessary to prevent falling down.

Further, for example, when the control is started again after the control ends by activating the brake with the weak braking force in step S15 and then no obstacle is detected in step S10, the brake is not activated in step S11 and activating the weak braking force is stopped. In this way, even when there are no obstacles in the middle of traveling backward, it is possible to control the automatic brake appropriately. The same applies when an obstacle appears in the middle of traveling backward.

The wheel loader 10 (an example of a work machine) of the embodiment includes the rear detection section 71, the state detection section 72, and the controller 26 (an example of a controller). The rear detection section 71 detects the rear of the vehicle body 1 when traveling backward. The state detection section 72 detects the state of the vehicle body 1. The controller 26 brakes the vehicle body 1 based on the detection of the state detection section 72 and the detection of the rear detection section 71.

As a result, the control of the automatic brake can be changed depending on the state of the vehicle body 1 and the detection result at the rear. For example, when the vehicle body 1 is unstable due to an operator loading a load or the like, the control of the automatic brake can be suppressed. Further, when the vehicle body 1 is stable and it is not necessary to prevent falling down, it is possible to brake and stop the vehicle body 1 by the automatic brake.

In the wheel loader 10 (an example of a work machine) of the embodiment, the controller 26 (an example of a controller) executes braking by automatic brake or control of suppressing the braking force of the automatic brake.

Thereby, for example, when the work machine is unstable, it is possible to suppress the braking of the automatic control section.

The wheel loader 10 (an example of a work machine) of the embodiment further includes the function OFF notification lamp 62 (an example of a first notification section). The function OFF notification lamp 62 notifies the suppression of automatic brake. The control of the automatic brake includes notification by the function OFF notification lamp 62.

As a result, it is possible to notify the operator that braking by the automatic brake is suppressed.

The wheel loader 10 (an example of a work machine) of the embodiment further includes an alarm device 61 (an example of a second notification section). The alarm device 61 notifies that the rear detection section 71 detects an obstacle S behind the vehicle body 1.

Thereby, it is possible to notify the operator that the obstacle S has been detected.

In the wheel loader 10 (an example of a work machine) of the embodiment, the controller 26 (an example of a controller) suppresses the braking force of the automatic brake when detecting an obstacle S by the rear detection section 71 in traveling backward, and when determining that the state of the vehicle body 1 detected by the state detection section 72 is a state in which the vehicle body 1 becomes unstable in a case of activating the automatic brake with the preset braking force.

As a result, when the wheel loader 10 is in an unstable state, it is possible to suppress the braking force of the automatic brake. Further, when the vehicle body 1 is in a stable state, it is possible to brake and stop the vehicle body 1 without suppressing the automatic brake function.

The wheel loader 10 (an example of a work machine) of the embodiment further includes a service brake 42 (an example of a service brake) and a brake valve 41. The brake valve 41 can adjust the supply amount of hydraulic fluid to the service brake 42. The controller 26 drives the brake valve 41 and uses the service brake 42 to execute braking by automatic brake.

As a result, it is possible to stop the vehicle body 1 when the obstacle S is detected.

The wheel loader 10 (an example of a work machine) of the embodiment further includes a parking brake 43. The controller 26 (an example of the controller) executes braking by the automatic brake with activating the parking brake 43.

As a result, it is possible to stop the vehicle body 1 when the obstacle S is detected.

In the wheel loader 10 (an example of a work machine) of the embodiment, the vehicle body 1 includes the work implement 3. The state of the vehicle body 1 includes the posture of work implement 3.

As a result, it is possible to detect that the vehicle body 1 is in an unstable state in which it is necessary to prevent falling down when the vehicle body 1 is braked with the preset braking force due to the posture of the work implement 3.

In the wheel loader 10 (an example of a work machine) of the embodiment, the vehicle body 1 includes a work implement 3. The state of the vehicle body 1 includes the state of the load on the work implement 3.

As a result, it is possible to detect that the vehicle body 1 is in an unstable state in which it is necessary to prevent falling down when the vehicle body 1 is braked with the preset braking force due to the posture and load of work implement 3.

In the wheel loader 10 (an example of a work machine) of the embodiment, the vehicle body 1 is the articulate type. The state of the vehicle body includes the articulate angle.

As a result, it is possible to detect that the vehicle body 1 is in an unstable state in which it is necessary to prevent falling down when the vehicle body 1 is braked with the preset braking force due to the articulation angle.

In the wheel loader 10 (an example of a work machine) of the embodiment, the state of the vehicle body 1 includes the inclination of the vehicle body 1.

As a result, it is possible to detect that the vehicle body 1 is in an unstable state in which it is necessary to prevent falling down when the vehicle body 1 is braked with the preset braking force due to the inclination of the ground or the like.

The method for controlling the wheel loader 10 (an example of a work machine) of the embodiment includes steps S10 (an example of a rear detection step), steps S12 and S14 (an example of a state detection step), and steps S11, S13, S15, and S16 (an example of a control step). Step S10 detects the rear of the vehicle body 1. Steps S12 and S14 detect the state of the vehicle body 1. Steps S11, S13, S15, and S16 control an automatic brake that automatically brakes the vehicle body 1 based on the detection result in step S10 and the detection result in steps S12 and S14.

As a result, the control of the automatic brake can be changed depending on the state of the vehicle body 1 and the detection result at the rear. For example, when the vehicle body 1 is unstable due to an operator loading a load or the like, the control of the automatic brake can be suppressed. Further, when the vehicle body 1 is stable and it is not necessary to prevent falling down, it is possible to brake and stop the vehicle body 1 by the automatic brake.

Although one embodiment of the present invention has been described above, the present invention is not limited to the above embodiment, and various modifications can be made without departing from the gist of the invention.

In the above embodiment, in step S12, it is determined whether or not it is necessary to prevent falling down by activating the weak braking force, and when it is not necessary, further, in step S14, it is determined whether or not it is necessary to prevent falling down by activating the preset braking force, but it is not limited to this.

Figure 10:
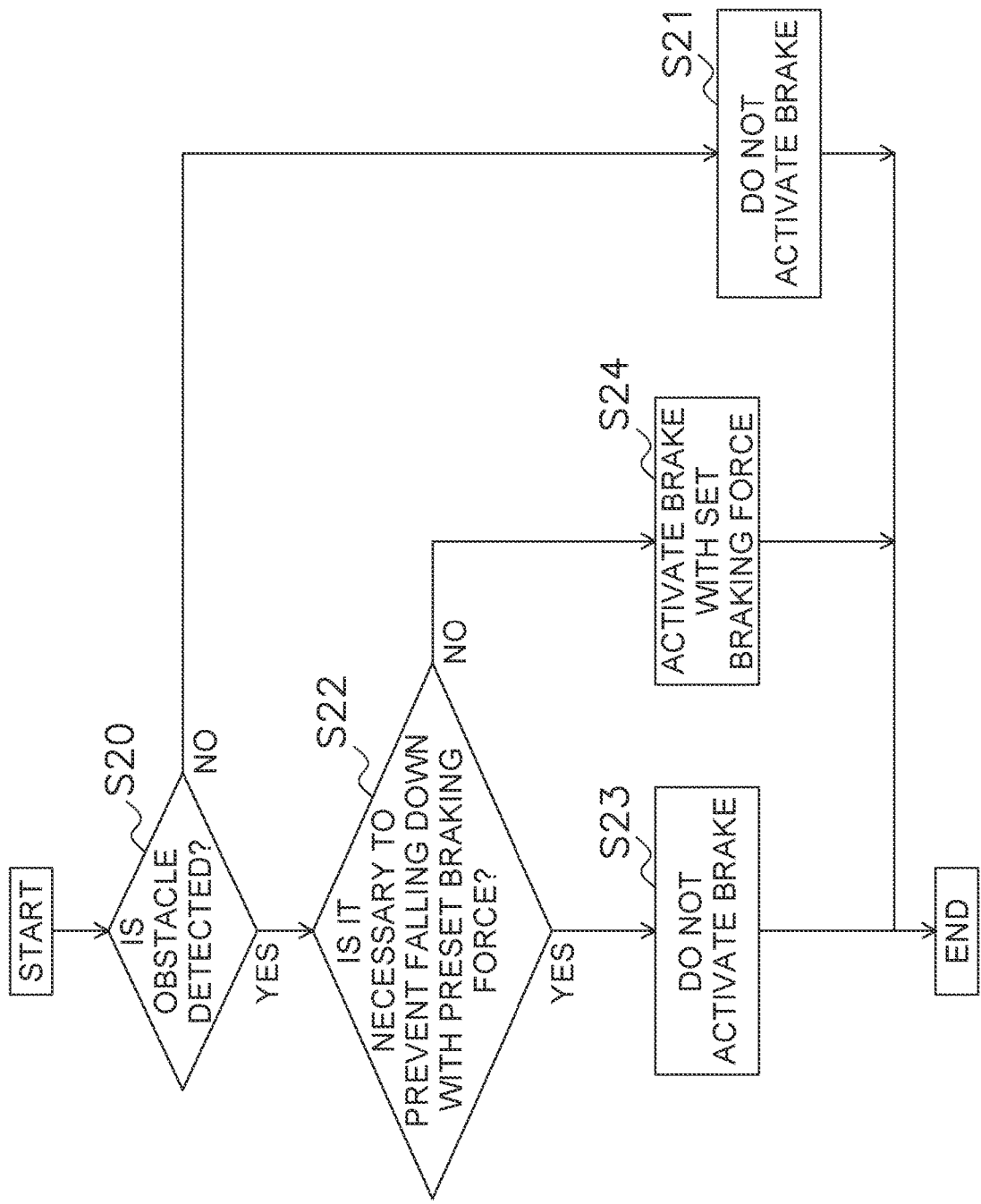
FIG. 10 is a flow chart showing a control operation of a wheel loader in a modified example of the embodiment according to the present disclosure.

For example, as illustrated in FIG. 10, the weak braking force may not be activated.

In the control flow illustrated in FIG. 10, first, in step S20, the obstacle determination section 84 of the controller 26 determines whether or not an obstacle is detected when the vehicle body 1 moves backward.

When it is not determined in step S20 that an obstacle exists, the controller 26 ends the control without activating the brake in step S21.

When it is determined in step S20 that an obstacle exists, in step S22, the state determination section 85 determines whether or not the state of the vehicle body 1 is a state requiring falling down prevention when the preset braking force is activated.

When it is determined in step S22 that the falling down prevention is necessary, the brake instruction section 82 of the controller 26 does not activate the brake in step S23, and the control ends.

Further, when it is determined in step S22 that the state of the vehicle body 1 is not a state requiring falling down prevention, in step S24, the brake instruction section 82 of the controller 26 operates the brake valve 41 to operate the service brake 42 with the preset braking force, and the control ends.

In step S22, the weak brake may be activated instead of not activating the brake.

Figure 11:
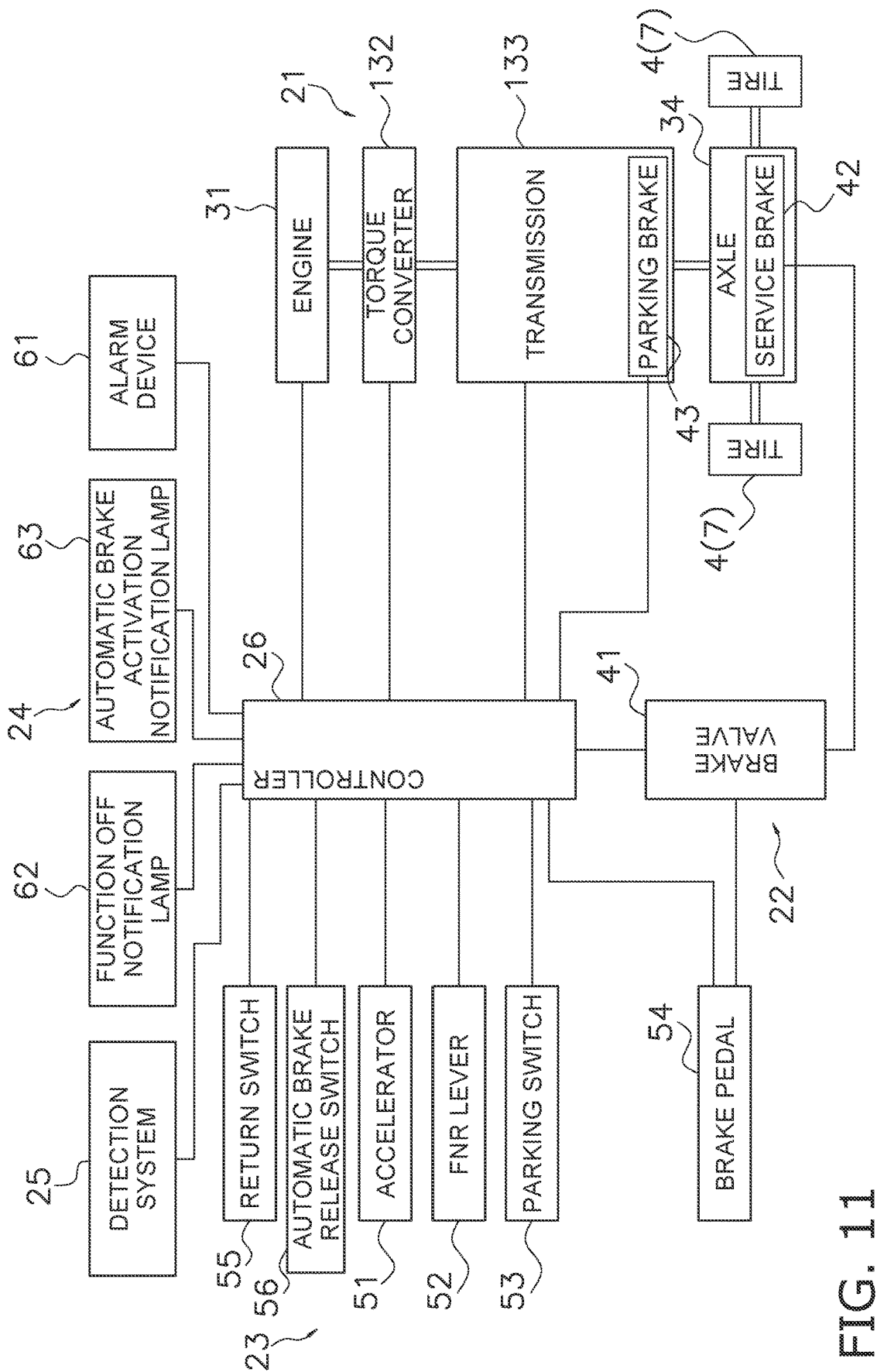
FIG. 11 is a block diagram showing a configuration of a drive system, a braking system, an operation system, a notification system, a detection system, and a controller of a wheel loader in a modified example of the embodiment according to the present disclosure.

In the above embodiment, the HST 32 is used in the drive system 21, but it is not limited to HST, and a torque converter may be used. FIG. 11 is a block diagram showing a configuration in which the torque converter 132 and the transmission 133 are provided in the drive system 21. The driving force from the engine 31 is transmitted to the transmission 133 via the Torque converter 132. The transmission 133 shifts the rotational driving force of the engine 31 transmitted via the torque converter 132 and transmits it to the axle 34. The transmission 133 is provided with a parking brake 43.

In the case of the torque converter, in order to generate a weak braking force, the opening degree of the brake valve 41 may be set small in the same manner as described above. Further, although the braking force is weaker than that of the HST, the accelerator 51 may be simply turned off. When generating the preset braking force, the opening degree of the brake valve 41 may be increased or the parking brake 43 may be used as in the above embodiment.

Further, not limited to HST, HMT (Hydro Mechanical Transmission) may be used.

For the control of the braking force, a service brake 42, a parking brake 43, and other means for changing the braking force can be appropriately applied.

In the above embodiment, the function OFF notification lamp 62 and the alarm device 61 are provided, but when the function OFF notification and the alarm notification can be distinguished, the function OFF notification lamp 62 may also serve as the alarm device 61.

The wheel loader of the above embodiment may be operated by an operator on board, or may be operated unattended.

In the above embodiment, the wheel loader has been described as an example of the work machine, but it may not be limited to the wheel loader, and a hydraulic excavator or the like may be used.

The work machine and the method for controlling the work machine of the present invention exert an effect capable of improving work efficiency and is useful as a wheel loader or the like.

The invention claimed is:

1. A work machine comprising:
   a rear detection section configured to detect rearward of a vehicle body of the work machine when the work machine is traveling backward, the rear detection section including at least one of a radar or a camera;
   a state detection section configured to detect a state of the vehicle body, the state detection section including at least one sensor; and
   a controller configured to execute a braking control of the vehicle body based on the detection of the rear detection section and the detection of the state detection section, the controller including a processor and a storage,
   the controller being configured to execute the braking control by executing automatic braking with a preset braking force or suppressing the automatic braking to a weak braking force weaker than the preset braking force,
   the controller being further configured to stop the automatic braking upon determining that
      the rear detection section has detected an obstacle during traveling backward, and
      the state of the vehicle body is a state in which the vehicle body will become unstable when activating the automatic braking with the preset braking force, or the state of the vehicle body is a state in which the vehicle body will become unstable when suppressing the automatic braking to the weak braking force.

2. The work machine according to claim 1, further comprising
   a first notification section configured to notify the suppression of the automatic braking or the stopping of the automatic braking, the first notification system including at least one of a lamp, a sound generating device, or a display,
   the controller being configured to control the first notification section.

3. The work machine according to claim 1, further comprising
   a second notification section configured to notify that an obstacle is detected behind the vehicle body by the rear detection section, the second notification system including at least one of a lamp, a sound generating device, or a display.

4. The work machine according to claim 1, further comprising
   a service brake; and
   a brake valve configured to adjust a supply amount of hydraulic fluid to the service brake,
   the controller being configured to drive the brake valve and use the service brake to execute the automatic braking.

5. The work machine according to claim 4, wherein
the controller is configured to suppress the automatic braking to the weak braking force by adjusting the brake valve to weaken the braking force of the service brake.

6. The work machine according to claim 1, further comprising
a parking brake,
the controller being configured to execute the automatic braking by activating the parking brake.

7. The work machine according to claim 1, wherein
the vehicle body includes a work implement, and
the state of the vehicle body includes a posture of the work implement.

8. The work machine according to claim 1, wherein
the vehicle body includes a work implement, and
the state of the vehicle body includes a state of a load on the work implement.

9. The work machine according to claim 1, wherein
the vehicle body is an articulate type, and
the state of the vehicle body includes an articulation angle.

10. The work machine according to claim 1, wherein
the state of the vehicle body includes an inclination of the vehicle body.

11. The work machine according to claim 1, wherein
the preset braking force is a braking force sufficient to cause the vehicle body to stop before reaching the obstacle.

12. A method for controlling a work machine, comprising:
detecting rearward of a vehicle body of the work machine when the work machine is traveling backward;
detecting a state of the vehicle body; and
executing a braking control of the vehicle body based on a detection of the rear detection step and a detection of the state detection step,
the braking control including executing automatic braking with a preset braking force or suppressing the automatic braking to a weak braking force weaker than the preset braking force,
the braking control being configured to stop the automatic braking upon determining that
an obstacle has been detected rearward of the vehicle during the traveling backward, and
the state of the vehicle body is a state in which the vehicle body will become unstable when activating the automatic braking with the preset braking force, or the state of the vehicle body is a state in which the vehicle body will become unstable when suppressing the automatic braking to the weak braking force.

13. The method according to claim 12, wherein
the preset braking force is a braking force sufficient to cause the vehicle body to stop before reaching the obstacle.

* * * * *